(12) United States Patent
Ogaki et al.

(10) Patent No.: US 6,778,288 B1
(45) Date of Patent: Aug. 17, 2004

(54) IMAGE CAPTURING SYSTEM

(75) Inventors: Takeshi Ogaki, Tama (JP); Akinori Iwase, Yokosuka (JP); Akihiko Fujiwara, Yokohama (JP); Kazuhiro Ogura, Kawasaki (JP); Nobuhisa Yoda, Kamakura (JP)

(73) Assignees: Kabushiki Kaisha Toshiba, Kawasaki (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,014

(22) Filed: Dec. 7, 1999

(30) Foreign Application Priority Data

Dec. 7, 1998 (JP) .......................................... 10-347036

(51) Int. Cl.[7] .......................... G06F 15/00; H04N 7/00; H04N 1/04; G03G 15/00
(52) U.S. Cl. ...................... 358/1.15; 358/474; 399/402; 399/87
(58) Field of Search ............................... 358/408, 1.15, 358/474, 296, 529; 399/402, 87, 362

(56) References Cited

U.S. PATENT DOCUMENTS

| 5,210,571 | A | | 5/1993 | Peloquin et al. ............ 355/203 |
|---|---|---|---|---|
| 5,619,649 | A | | 4/1997 | Kovnat et al. .............. 395/200 |
| 5,630,079 | A | | 5/1997 | McLaughlin ................. 395/335 |
| 5,682,227 | A | * | 10/1997 | Taguchi et al. ............... 355/25 |
| 5,703,694 | A | * | 12/1997 | Ikeda et al. ................. 358/296 |
| 5,745,253 | A | * | 4/1998 | Muramatsu et al. ........ 358/408 |
| 5,768,483 | A | | 6/1998 | Maniwa et al. ............. 395/114 |
| 5,812,907 | A | * | 9/1998 | Itoh et al. ..................... 399/87 |

FOREIGN PATENT DOCUMENTS

| JP | 1-261667 | 10/1989 |
|---|---|---|
| JP | 9-168066 | 6/1997 |
| JP | 11-17862 | 1/1999 |
| JP | 11-55447 | 2/1999 |
| JP | 11-120369 | 4/1999 |
| JP | 11-196224 | 7/1999 |

* cited by examiner

*Primary Examiner*—Kimberly Williams
*Assistant Examiner*—Saeid Ebrahimi
(74) *Attorney, Agent, or Firm*—Foley & Lardner LLP

(57) ABSTRACT

Processes from the scanning of a document in a preset scan mode to a process executed for the scanned image are set as scan jobs. When an icon associated with the scan job is selected, the scan job is executed. Thereby, the processes from the scanning of the document to the process executed for the scanned image can be automatically executed by selecting the associated icons, and the user operations are simplified and made easier.

8 Claims, 9 Drawing Sheets

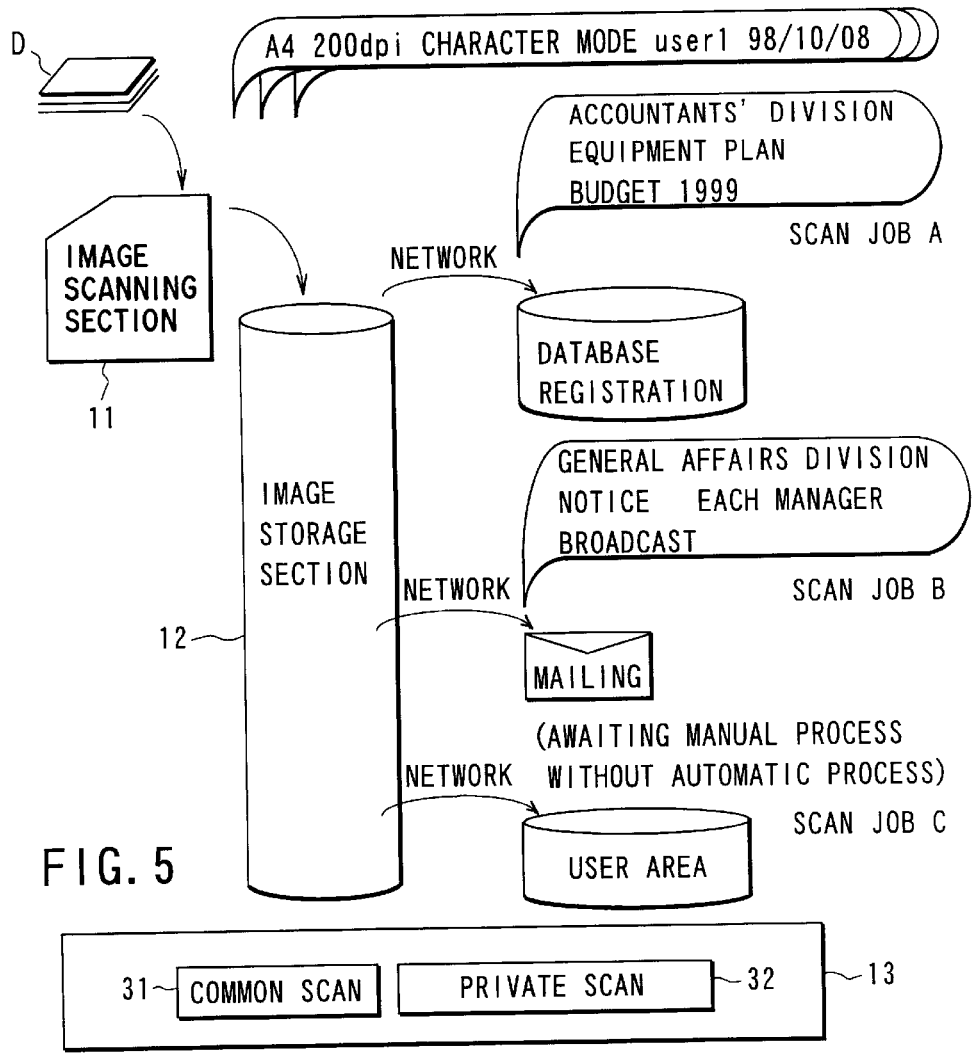
FIG. 5
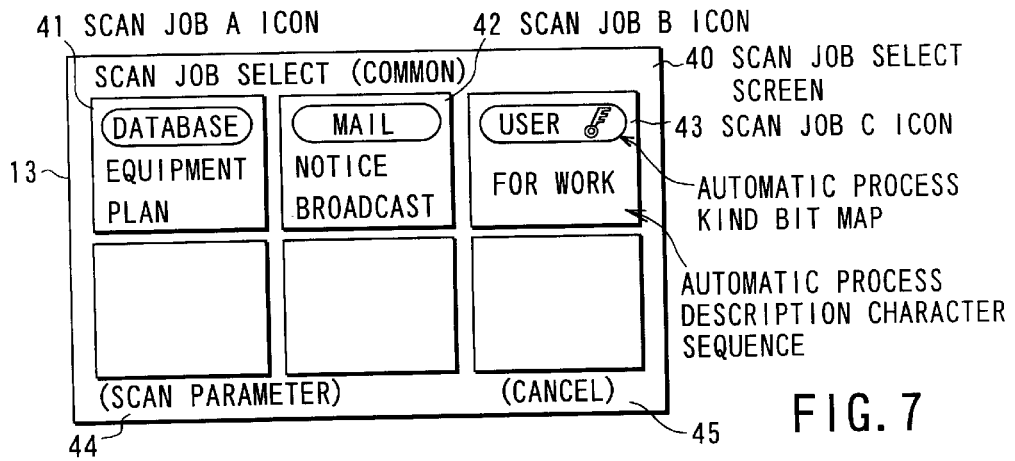
FIG. 6
FIG. 7

FIG. 11 — 19a SCREEN MANAGEMENT TABLE

| SCREEN NO. | SETTING OF USE RIGHT | PASSWORD | DISPLAY CHARACTER SEQUENCE | DISPLAY ICON NO. |
|---|---|---|---|---|
| 0 | × | × | COMMON | 11, 12, 13 |
| 10 | × | × | GENERAL AFFAIRS DIVISION | 21, 22 |
| 123 | ○ | F(1234) | TANAKA | 31 |
| ⋮ | ⋮ | ⋮ | ⋮ | |

FIG. 12 — 20a ICON MANAGEMENT TABLE

| ICON NO. | DISPLAY BIT MAP | DISPLAY CHARACTER SEQUENCE | SCAN JOB NO. | (x, y) |
|---|---|---|---|---|
| 11 | data1 | "EQUIPMENT PLAN" | 1 | |
| 21 | mail1 | "INTRA-DIVISION BROADCAST" | 16 | |
| 31 | none1 | "CHORE" | 22 | |
| ⋮ | ⋮ | ⋮ | ⋮ | ⋮ |

FIG. 13 — 21a SCAN JOB MANAGEMENT TABLE

| SCAN JOB NO. | SETTING OF EXECUTE RIGHT | PASSWORD | SCAN JOB PROGRAM NAME | SCAN PARAMETER FILE NAME | JOB PARAMETER FILE NAME | IMAGE ID |
|---|---|---|---|---|---|---|
| 1 | × | × | database | SC0001 | db0001 | |
| 16 | ○ | f(9876) | sendmail | SC0016 | ml0008 | |
| 22 | × | × | scanonly | SC0022 | × | |
| ⋮ | ⋮ | ⋮ | ⋮ | ⋮ | ⋮ | |

IMAGE CAPTURING SYSTEM

BACKGROUND OF THE INVENTION

The present invention relates to an image capturing system wherein a digital copying machine, for example, is used as a shared scanner which is connected to a network and is used by a plurality of users.

In these years, an image capturing system using a scanner shared by a plurality of users has been used, for example, in an environment in which a digital copying machine serving as a shared scanner and a plurality of personal computers (PCs) used by the users are connected by a network.

In this image capturing system, a user who intends to perform a document scanning operation goes to the digital copying machine serving as the shared scanner and instructs it to perform the document scanning operation. The scanned image is sent to a storage section in the PC of the associated user or a server, and then the user instructs the PC to perform an image processing operation.

Accordingly, the user is required to perform a great number of user operation steps from the scanning of the document to the execution of processing of the scanned image. These steps are complicated and time-consuming.

In addition, the digital copying machine serving as a shared scanner can be used by anyone. In order to associate the respective users with processes available for only specified users, it is necessary to register and manage all user information, and the user has to perform a user operation for a user verification step, which is time-consuming.

BRIEF SUMMARY OF THE INVENTION

An object of the present invention is to provide an image capturing system wherein when a document is scanned by a scanner shared by a plurality of users, operations for executing a process for a scanned image are simple and easy to understand.

Another object of the invention is to provide an image capturing system wherein an operation available for only a specified user can be set, and a process available for only a specified user can be executed by simple and easy-to-understand operations.

According to an aspect of the invention, there is provided an image capturing system shared by a plurality of users, the system comprising:

scanning means for scanning an image of a document in a plurality of scan modes;

setting means for setting scan jobs, which consist of a process to scan an image of a document in a scan mode and a process to execute a job on the image of the document scanned in the scan mode, in association with instruction keys; and executing means for scanning, when the instruction key associated with the scan job by the setting means has been designated, the document in the scan mode of the scan job associated with the designated instruction key, and executing the process set by the scan job on the scanned image.

According to another aspect of the invention, there is provided an image capturing system shared by a plurality of users, the system comprising:

scanning means for scanning an image of a document in a plurality of scan modes;

first setting means for setting scan jobs, which consist of a process to scan an image of a document in a scan mode and a process to execute a job on the image of the document scanned in the scan mode, in association with instruction keys;

second setting means for setting a plurality of select screens for selecting the instruction keys set by the first setting means;

designating means for designating one of the select screens set by the second setting means;

displaying means for displaying the select screen designated by the designating means; and executing means for executing the scan job associated with the instruction key by the first setting means when the instruction key has been designated from the select screen displayed by the displaying means.

According to still another aspect of the invention, there is provided an image capturing method for an image scanning system shared by a plurality of users and having scanning means for scanning an image of a document in a plurality of scan modes, the method comprising the steps of:

setting scan jobs, which consist of a process to scan an image of a document in a scan mode and a process to execute a job on the image of the document scanned in the scan mode, in association with instruction keys; and scanning, when the instruction key associated with the scan job by the setting step has been designated, the document in the scan mode of the scan job associated with the designated instruction key, and executing the process set by the scan job on the scanned image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a view for describing a flow of a scan job;

FIG. 6 shows an example of display on a select screen for scan functions;

FIG. 7 shows an example of display on a scan job select screen;

FIG. 11 shows an example of a screen management table;

FIG. 12 shows an example of an icon management table;

FIG. 13 shows an example of a scan job management table;

DETAILED DESCRIPTION OF THE INVENTION

An embodiment of the present invention will now be described with reference to the accompanying drawings.

Figures 1A, 1B:
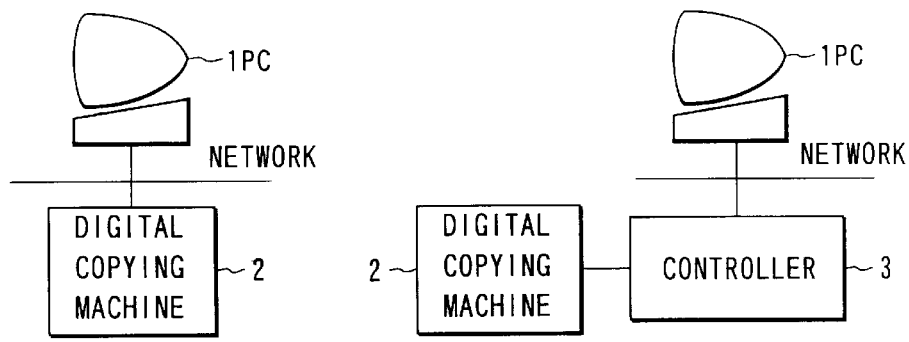
FIGS. 1A and 1B show schematic structures of network environments in which an image capturing system according to an embodiment of the present invention is constituted.

FIGS. 1A and 1B show examples of connection of a network constituting an image capturing system according to the present invention.

The network serving as an environment for using the image capturing system, as shown in FIG. 1A, is constructed, for example, in an office. A plurality of personal computers (PC) 1 used by a plurality of users are connected to the network. In addition, a digital copying machine 2 having a scanner for scanning a document, which can be shared by the users, is connected to the network.

Alternatively, as shown in FIG. 1B, a controller 3 is connected to the network to which the PCs 1 are connected as in the example shown in FIG. 1A. The digital copying machine 2 having the scanner shared by the users is connected to the controller 3.

Figure 3:
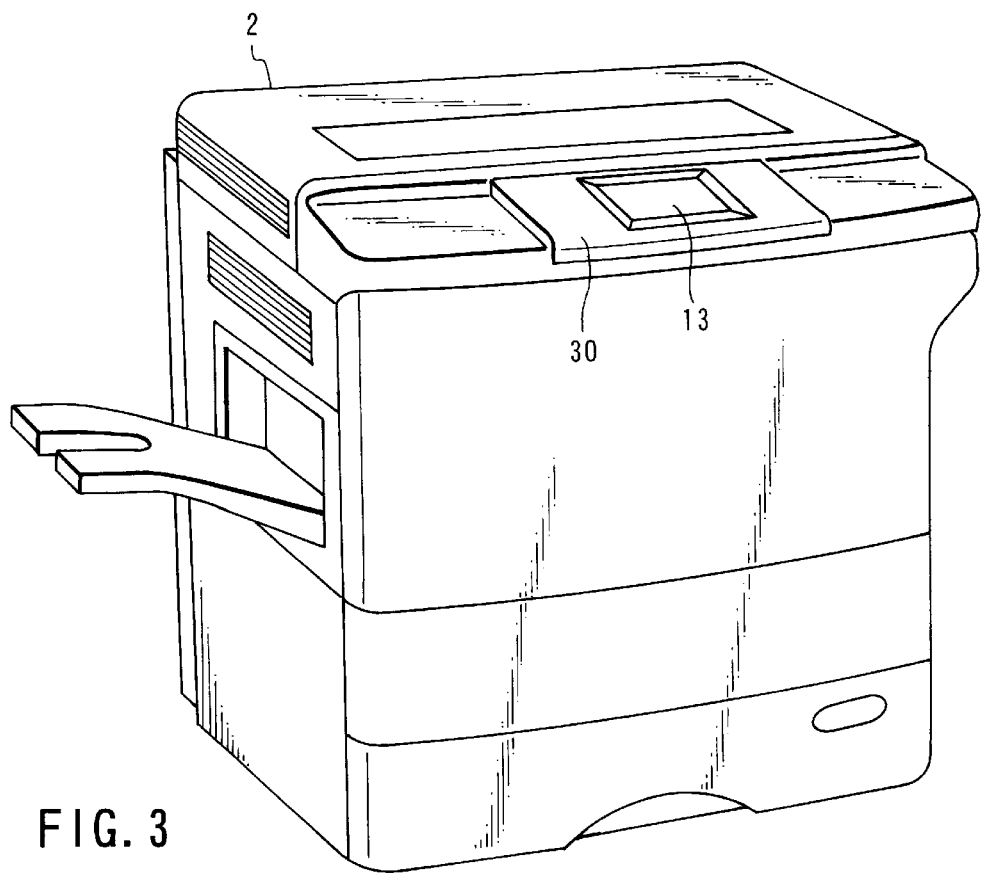
FIG. 3 is a perspective view showing an external structure of a digital copying machine.

An operation panel 30, as shown in FIG. 3, for displaying operation guide instructions to the user or inputting various operation instructions is provided on the digital copying machine 2, as will be described later.

Figure 2:
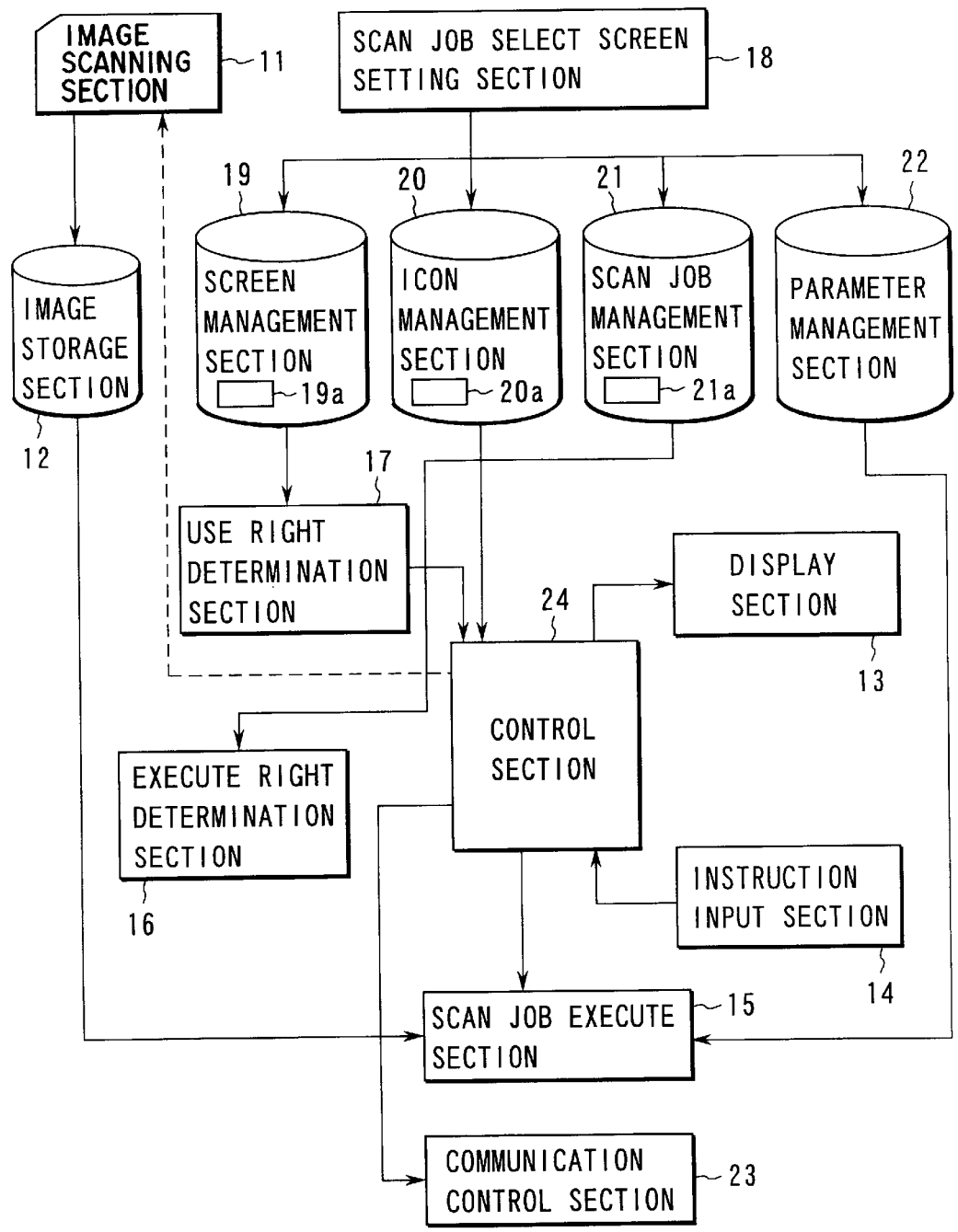
FIG. 2 is a block diagram showing a structure of the image capturing system.

FIG. 2 is a block diagram showing a structure of the image capturing system.

Specifically, the image capturing system comprises an image scanning section 11, an image storage section 12, a screen display section 13, an instruction input section 14, a scan job execute section 15, an execute right determination section 16, a use right determination section 17, a scan job select screen setting section 18, a screen management section 19, an icon management section 20, a scan job management section 21, a parameter management section 22, a communication control section 23, and a control section 24.

The image scanning section 11 functions to scan documents one by one which are set at a predetermined position by the user. In addition, the image scanning section 11 functions to scan one by one documents of a file unit consisting of a plurality of documents which are fed by an automatic sheet feeder (not shown) one by one.

The image storage section 12 stores scanned images. The display section 13 displays a guide screen or various icons to the user. The instruction input section 14 comprises hard keys, through which the user performs various settings or inputs operation instructions, and instruction keys associated with icons displayed on the display section 13. The instruction keys of the display section 13 and instruction input section 14 are provided, for example, on the operation panel 30 to be described later.

The scan job execute section 15 executes scan jobs (scan processes) relating to various conditions and processing contents associated with various steps from the scanning of documents to the execution of processing for the scanned documents. The execute right determination section 16 determines an execute right which permits a specified user to execute a scan job.

The use right determination section 17 determines the presence/absence of the use right of the user, where the use right is set on the scan job select screen for selection of scan jobs. The use right is set on one of a plurality of kinds of scan job select screens, which provides a permission of use only to a specified user. The scan job select screen setting section 18 sets the scan job select screen for selecting the scan job.

The screen management section 19 manages the display screen displayed on the display section 13. The icon management section 20 manages icons serving as instruction keys for designating various scan jobs. The scan job management section 21 manages the scan jobs associated with the icons.

The parameter management section 22 manages parameters indicating various operation modes and processing contents registered as contents of scan jobs. The communication control section 23 performs a control for communication with the network. The control section 24 controls the above-described structural elements.

The screen management section 19 has a screen management table 19a for managing the screen which is displayed on the display section 13 by the user's input to the instruction key of the instruction input section 14. The icon management section 20 has an icon management table 20a for managing the icons displayed on the display section 13. The scan job management section 21 has a scan job management table 21a for managing scan jobs executed by the user's operations.

In the case of the network environment as shown in FIG. 1A, the above structural elements are provided within the digital copying machine 2. In the case of the network environment as shown in FIG. 1B, the image scanning section 11 is provided in the digital copying machine 2, and the other structural elements are provided within the controller 3. The above structural elements may be provided in any device connected to the network.

FIG. 3 is a perspective view showing an external appearance of the digital copying machine 2 used in the network environment shown in FIG. 1A. AS is shown in FIG. 3, the operation panel 30 having the display section 13 is provided on an upper front portion of the digital copying machine 2. The digital copying machine 2 may be provided with an automatic sheet feeder (not shown) for feeding documents one by one to the image scanning section 11.

Figure 4:
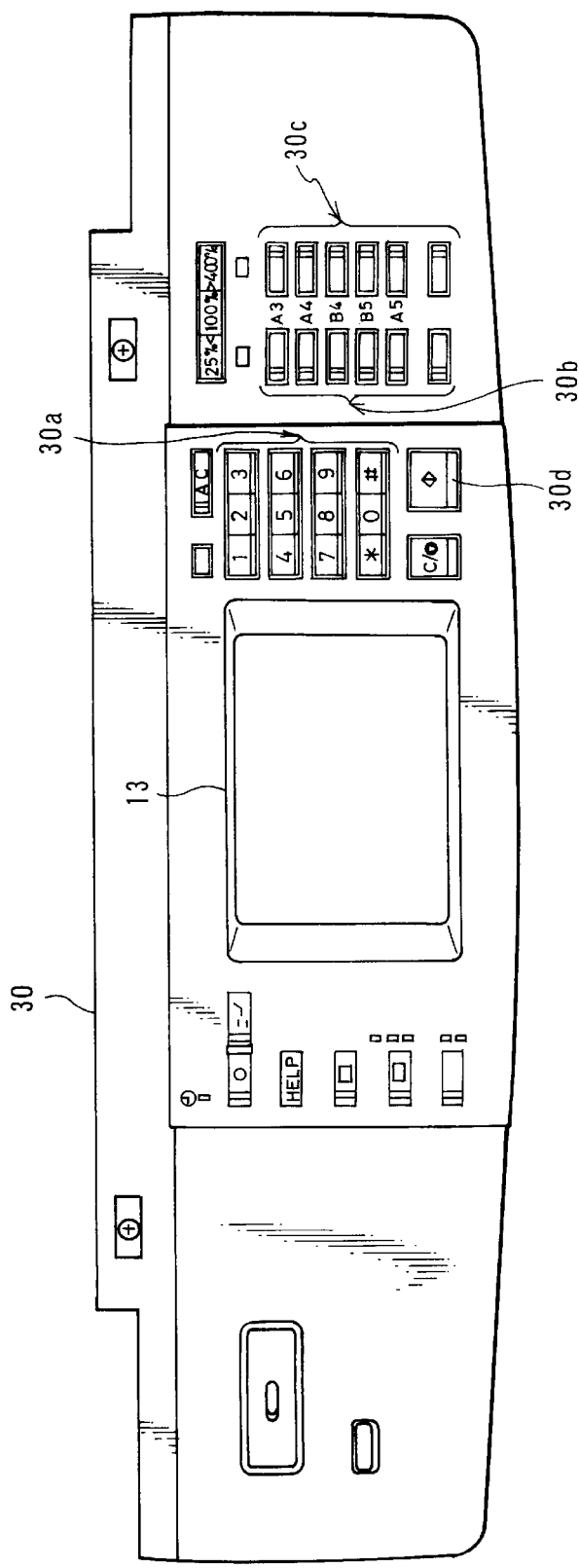
FIG. 4 is a front view showing a schematic structure of an operation panel.

FIG. 4 is a front view of the operation panel 30 provided on the digital copying machine 2 shown in FIG. 3. As is shown in FIG. 4, the operation panel 30 is provided with various hard keys constituting part of the instruction input section 14, and with the display section 13.

The display section 13 comprises a liquid crystal display (LCD) device including a touch panel. The display section 13 displays, e.g. icons for instructing operation guide instructions to the user and inputting operation instructions, which icons constitute part of the instruction input section 14.

The various hard keys include ten-keys 30a for inputting numerals 0 to 9, document size keys 30b for designating document sizes, sheet size keys 30c for designating sheet sizes, and a start button 30d for instructing the start of a copying operation, a scan operation, a scan job, etc.

Referring to FIG. 5, a description will now be given of a case where a document scanning process and subsequent various processes executed for scanned images are set as scan jobs.

In the image capturing system, as shown in FIG. 5, documents D are scanned by the image scanning section 11. The scanned images are temporarily stored in the image storage section 12. The images stored in the image storage section 12 are registered in a database, sent as mails, or sent to the user PC on the network.

The various processes for scanning documents, temporarily storing scanned images and executing processing for the scanned images are referred to as scan jobs. When scan jobs are executed, the scan mode at the time of document scanning and the processing contents for scanned images are set by various parameters.

The scanning of document images requires various parameters such as a document size, resolution, image scan mode, density and dither designation. The storing of scanned images requires parameters such as a user (input operator) name or a user (input operator) ID, date and time of input, and image ID. These parameters necessary for the image scan process and image storage are called scan parameters.

There are various processes to be executed for scanned images. The required parameters vary depending on the kind of process. For example, in the case of a process for registering images in a database, required parameters are a cabinet name of a destination of registration, a folder name, a file name and a document name. In the case of a process for mailing scanned images, required parameters are a sender, an address of destination and a method of mailing such as broadcasting, confidential-delivery or express-delivery. The parameters necessary for the various processes for scanned images are called job parameters.

Using the scan parameters and job parameters, a series of processes from the scanning of documents to the processing of scanned images can be set as scan jobs.

For example, a scan job A, as shown in FIG. 5, is a series of processes as described below. The image scanning section 11 scans documents in a character scan mode, with a document size set at A4 and a resolution set at 200 dpi. The scanned document images are temporarily stored in the image storage section 12, with the user name set as USER1 and the date of processing set at Oct. 8, 1998. Subsequently, the image data temporarily stored in the image storage section 12 is registered through the network as file data in the form of a file named "BUDGET 1999" in a folder named "EQUIPMENT PLAN" in a cabinet named "ACCOUNTANTS' DEVISION" in the database.

A scan job B is a series of processes as described below. The image scanning section 11 scans documents in a character scan mode, with a document size set at A4 and a resolution set at 200 dpi. The scanned document images are temporarily stored in the image storage section 12, with the user name set as USER1 and the date of processing set at Oct. 8, 1998. Subsequently, the image data temporarily stored in the image storage section 12 is sent through the network in a broadcasting mode as a mail, with the sender specified as the "GENERAL AFFAIRS DIVISION", the address specified as the "MANAGER OF EACH DIVISION", and the title specified as "NOTICE".

A scan job C is a series of processes as described below. The image scanning section 11 scans documents in a character scan mode, with a document size set at A4 and a resolution set at 200 dpi. The scanned document images are temporarily stored in the image storage section 12, with the user name set as USER1 and the date of processing set at Oct. 8, 1998. Subsequently, the image data temporarily stored in the image storage section 12 is shifted through the network into a user area defined in a storage section (not shown) in a pre-designated user PC1. The image data shifted to the user area is kept for a future process by a user's manual operation.

The scan jobs, like scan jobs A, B and C as described above, are automatic processes in which at least the document image scan process and the process for the scanned images are executed successively. The contents of the scan jobs are set by plural parameters.

A scan function select screen, through which the user selects the scan job to be executed, will now be described with reference to an example shown in FIG. 6.

In the present image capturing system, the user selects a scan function and designates one of scan jobs from a scan job select screen which is displayed in accordance with the selected scan function. Thus, the scan job to be executed is determined.

Specifically, at the time of executing a scan job, the user sets a document on the image scanning section 11 and selects a scan function from a scan function select screen displayed on the display section 13 of operation panel 30.

The scan function select screen, as shown in FIG. 6, displays a common scan icon 31 for selecting a common scan by a plurality of users, and a private scan icon 32 for selecting an individual scan (private scan) by specified users.

In the case of the common scan, a scan job select screen which can be commonly used by plural users is selected. Specifically, a scan job select screen which can be freely used by all users is selected. In addition, a scan job select screen for scan jobs, which are used by specified users but not be assigned to a specific group or individual, is displayed.

In the case of the private scan, a scan job select screen which can be used by specified users alone is displayed. For example, a select screen for scan jobs available to only a specified individual is displayed. In addition, a scan job select screen available to only users belonging to a specified section or a specified project group in an office, where the network is constructed, is displayed.

In the case of the private scan, one of a plurality of scan job select screens, which is to be used by the user, is selected. Specifically, numerals of an associated screen number are input by the ten-keys 30a of operation panel 30 to display a scan job select screen.

The relationship between the scan job select screen and scan jobs will now be described in detail with reference to FIG. 7 showing an example of the scan job select screen.

FIG. 7 shows an example of a scan job select screen 40 displayed on the display section 13 of operation panel 30. As is shown in FIG. 7, the scan job select screen 40 comprises a character sequence indicating a title given to the screen, a plurality of icons 41, 42 and 43 associated with various scan jobs, a scan parameter key 44 for setting a scan mode, and a cancel key 45 for instructing cancellation of an operation. Each of the icons 41, 42 and 43 comprises an automatic process kind bit map and an automatic process description character sequence.

The automatic process kind bit map represents the kind of an automatic process for scanned images. For example, it is a bit map representing a database registration process or a mailing process.

In addition, since the user cannot easily understand the content of the automatic process from the automatic process kind bit map alone, the automatic process description character sequence represents the content of the automatic process executed for the scanned image. For example, the character sequence represents the destination of registration in the database for registering the scanned images or the method of mailing.

In other words, the automatic process description character sequence may be considered to be an name given to the scan job, that is, a combination of a scan, scan parameters, a job and job parameters.

For example, on the scan job select screen 40 shown in FIG. 7, the icon 41 located at an upper left area is associated with the aforementioned scan job A. Accordingly, when the upper-left icon 41 is designated by the user, the scan process is executed in accordance with the scan parameters defined as scan job A. Subsequent to the scan process, the process for the scanned image is executed according to the job parameters defined as scan job A. In this example, the process executed according to the job parameters is the process for registering the scanned image in the folder "EQUIPMENT PLAN" in the database according to a program for registering the scanned image in the database. In order to make the process of scan job A easily understandable to the user, "EQUIPMENT PLAN" is indicated at the icon 41.

On the scan job select screen 40 shown in FIG. 7, the icon 42 located at an upper middle area is associated with the aforementioned scan job B. When the icon 42 is designated by the user, the scan process is executed in accordance with the scan parameters defined as scan job B. Subsequent to the scan process, the process for sending the scanned image by mailing according to the job parameters defined as scan job B executed. In this case, the process executed according to the job parameters is the process for mailing the scanned image in a "NOTICE BROADCAST" mode according to a mail transmission program. In order to make the process of scan job B easily understandable to the user, "NOTICE BROADCAST" is indicated at the icon 42.

On the scan job select screen 40 shown in FIG. 7, the icon 43 located at an upper right area is associated with the aforementioned scan job C. When the icon 43 is designated by the user, the scan process is executed in accordance with the scan parameters defined as scan job C. Subsequent to the scan process, the process according to the job parameters defined as scan job C executed. In this case, since no job parameters are present, the process for shifting the scanned image to the user area is executed as the scan job C. In order to make the process of scan job C easily understandable to the user, the character sequence "FOR WORK" indicating the user area, to which the scanned image is shifted, is indicated at the icon 43.

Further, in the upper-right icon 43 on the scan job select screen 40 shown in FIG. 7, a key-mark is displayed within the automatic process kind bit map. The key-mark indicates that an execute right, which permits only a specified user to execute the scan job, is set on the scan job associated with the icon 43. The execute right is set on the scan job which can be executed by the specified user alone. The scan job, on which the execute right is set, can be executed only where the user having the execute right has been identified by a user verification process using a password, etc. Thereby, the scan job, on which the execute right is set, can be executed by only the user who knows a preset password.

Specifically, when the icon 43 is selected by the user, the user is required to input the password. Then, the user inputs the password. If the input password coincides with the set password, the execution of the scan job associated with the icon 43 is permitted. If the input password does not coincide with the set password, the execution of the scan job associated with the icon 43 is not permitted.

As has been described above, the instruction keys associated with the scan jobs are displayed by means of icons, by which the user can easily understand the contents of scan jobs.

Accordingly, when the scan job is designated, the content of the scan job can be easily understood.

Moreover, the mark is displayed on the icon in order to indicate that the icon is associated with the scan job on which the execute right is set.

Accordingly, the scan job, on which the execute right is set and which cannot be executed unless the use knows the password, can easily be displayed to the user.

In the above example, the permission/prohibition of the execution of the scan job is determined by the input of the password as the means for verifying the execute right. However, the execute right may be verified by using the content of a recording medium carried by the user, such as a magnetic card, an IC card or a radio card. In this case, a recording medium reader (e.g. card reader) corresponding to the recording medium employed is provided near the operation panel 30. When the scan job on which the execute right is set is executed, the content in the recording medium is read for verification.

Information inherent to each user, such as a fingerprint, may be used to very the execute right.

In the above example, the execute right is set on the scan job to be executed by the specified user, and the scan job is executed only when the execute right has been verified by the password, etc.

Thereby, the scan job available to the specified user can be set even if all user information is not registered and managed.

Figure 8:
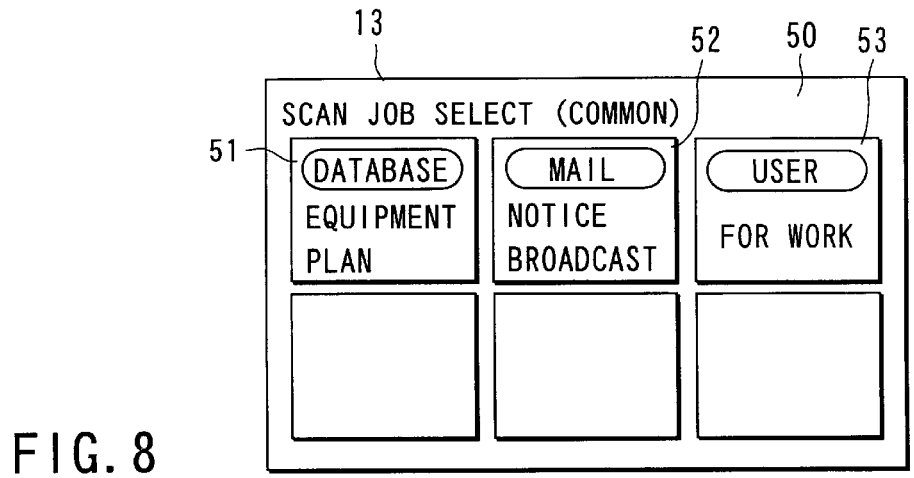
FIG. 8 shows an example of display on the scan job select screen.
Figure 9:
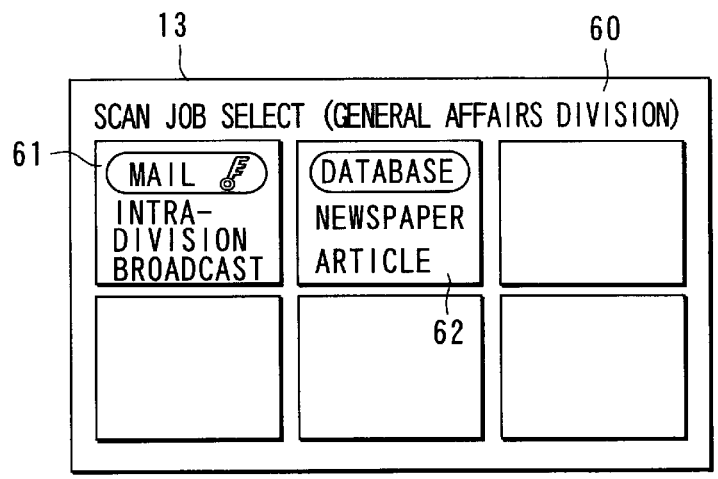
FIG. 9 shows an example of display on the scan job select screen.
Figure 10:
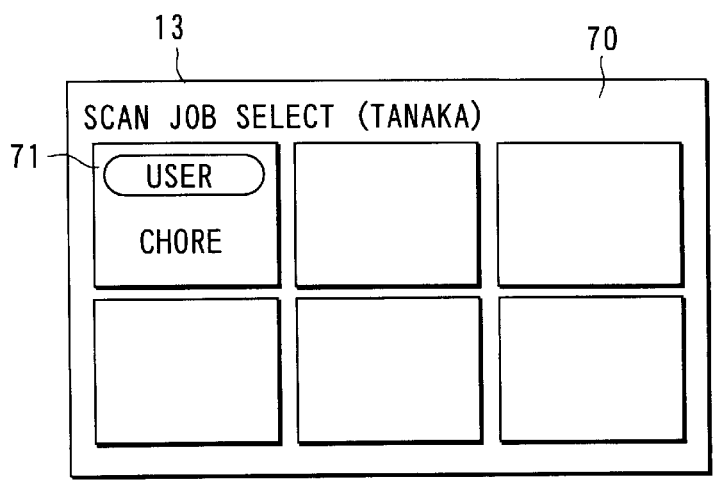
FIG. 10 shows an example of display on the scan job select screen.

The kinds and attributes of the scan job select screens will now be described reference to FIGS. 8 to 10 showing examples of display of scan job select screens, FIG. 11 showing the screen management table 19a, FIG. 12 showing the icon management table 20a and FIG. 13 showing the scan job management table 21a.

FIG. 8 is an example of display of a scan job select screen 50 which is displayed on the display section 13 of operation panel 30 when "COMMON SCAN" available to given users sharing the digital copying machine 2 has been selected from the scan function select screen as shown in FIG. 6.

Screen number "0" is set on the scan job select screen 50 on the screen management table 19a. Icon numbers "11, 12, 13" are defined on the screen management table 19a for selectable icons 51, 52 and 53 on the scan job select screen 50.

FIG. 9 is an example of display of a scan job select screen 60 which is available to only a specified user, among the users sharing the digital copying machine 2, who knows the screen number, and which is displayed on the display section 13 of operation panel 30 when the user has selected "PRIVATE SCAN" from the scan function select screen as shown in FIG. 6 and the user has input the screen number.

In this case, only members in the general affairs division, among users sharing the digital copying machine 2, know the screen number. The scan job select screen 60 is exclusive "for the general affairs division" and is available to only the members in the general affairs division, who know the screen number. In this context, the "members in the general affairs division" are not the organization/members registered in advance and managed but the members in the general affairs division who are informed of the screen number, irrespective of the so-called user management (that is, there is no need to register all organization/users in advance).

Screen number "10" is set on the scan job select screen 60 "for the general affairs division" by the screen management table 19a. Icon numbers "21, 22" are defined on the screen management table 19a shown in FIG. 11 for icons 61 and 62 selectable on the scan job select screen 60.

Icon number "21" is defined for the upper-left icon 61 (the automatic process kind bit map representing the mail; the automatic process description character sequence representing the intra-division broadcast) on the scan job select screen 60 shown in FIG. 9. Scan job number "16" is set on the icon 61 by the icon management table 20a shown in FIG. 12. An execute right of password "9876" is set on the scan job number "16" by the scan job management table 21a shown in FIG. 13. Accordingly, password "9876" is set for the icon 61.

Specifically, the user who knows the password "9876" assigned to the icon 61 (i.e. who has the execute right of the scan job) can execute the scan job associated with this icon. In this context, the "user" refers to not a user registered in advance and managed but a user informed of the password, irrespective of so-called user management (there is no need to register passwords to all users in advance).

FIG. 10 is an example of display of a scan job select screen 70 for "specified user (Tanaka)", which is available to a specified user, among the users sharing the digital copying machine 2, and which is displayed when the user has selected "PRIVATE SCAN".

Screen number "123" is set on the scan job select screen 70 "for specified user" by the screen management table 19a shown in FIG. 11. Icon number "31" is defined on the screen management table 19a for an icons 71 selectable on the scan job select screen 70.

A use right is set on the screen number "123" representing the scan job select screen 70 by the screen management table 19a. In addition, password "1234" is set on the screen management table 19a as a password for recognizing the use right to use the scan job select screen 70.

The use right is used to indicate that the scan job select screen is available to only the specified user. The user, who knows the preset password as the means for verifying the specified user, can execute the scan job.

Specifically, when the user has selected "PRIVATE SCAN" and has designated screen number "123" for the scan job select screen, the user is requested to input the password. If the user inputs the password and the input password coincides with the password set for the use right, the use of the scan job select screen is permitted. If the password does not coincide, the use of the scan job select screen is not permitted and the scan job select screen with screen number "123" is not displayed.

Thus, the scan job select screen, on which the use right is set, cannot be displayed by the input of the screen number alone. Only the user who knows both the screen number and password can use this scan job select screen.

The "specified user" in this context refers to not a user registered in advance and managed, but a user informed of the password and permitted to use the screen, irrespective of so-called user management (there is no need to register all users and passwords in advance).

Moreover, the "specified user" in this context may refer to a single user or a plurality of users, depending on the setting of the password and the method of notice of the password.

In the above example, the permission/prohibition of the use of the scan job select screen is determined by the input of the password as the means for verifying the use right. However, the use right may be verified by using the content of a recording medium carried by the user, such as a magnetic card, an IC card or a radio card. In this case, a recording medium reader (e.g. card reader) corresponding to the recording medium employed is provided near the operation panel. When the scan job select screen on which the use right is set is designated, the content in the recording medium is read for verification.

Information inherent to each user, such as a fingerprint, may be used to very the use right.

In the above example, the use right is set on the scan job select screen, the use of which is permitted to only the specified user. The scan job select screen is displayed only when the use right has been verified by the password, etc.

Thereby, the scan job select screen available to only the specified user can be set even if all user information is not registered and managed.

User operations in the case where the use right or execute right is set will now be described with reference to FIGS. 9 and 10.

A description will now be given of a case where, for example, the icon 61 is designated on the scan job select screen 60 shown in FIG. 9.

Suppose that screen number "10" has been input for the scan job select screen 60 exclusive "for the general affairs division." In this case, since no use right is set on this screen, the scan job select screen 60 "for the general affairs division" is displayed, as shown in FIG. 9, without the input of the password.

On the scan job select screen 60 shown in FIG. 9, the user selects the icon 61 indicating the scan job "MAIL:INTRA-DIVISION BROADCAST." Then, since the execute right is set on the scan job associated with this icon, the user inputs the password for verifying the execute right which permits the execution of the scan job. In this case, if the user inputs the correct password "9876," the execution of the scan job is started.

A description will now be given of a case where the icon 71 is designated on the scan job select screen 70 shown in FIG. 10.

Suppose that screen number "123" has been input for the scan job select screen 70 exclusive "for the specified user (Tanaka)." In this case, since the use right is set on this scan job select screen 70, the user is requested to input the password for verifying the use right. If the user inputs the correct password "1234," the scan job select screen 70 "for the specified user (Tanaka)" is displayed. Then, if the user selects the icon 71 indicating "USER:CHORE" and depresses the start button 30d, the execution of the scan job associated with the icon 71 is started without the input of the password, since no execute right is set on this scan job.

A description will now be given of the details of the contents of the screen management table 19a, icon management table 20a and scan job management table 21a.

FIG. 11 shows an example of the screen management table 19a, FIG. 12 shows an example of the icon management table 20a, and FIG. 13 shows an example of the scan job management table 21a.

The screen management table 19a manages a plurality of scan job select screens, and it comprises items: the screen number given to the select screen for selecting the scan job; the presence/absence of the use right; the password; the display character sequence; and the display icon number.

As is shown in FIG. 11, for example, setting/management is made such that the use right is not set for screen number "0", and the screen title is "COMMON." On the other hand, setting/management is made such that the use right is not set for screen number "10", and the screen title is "GENERAL AFFAIRS DIVISION." In addition, as regards screen number "123," setting/management is made such that the use right is set for screen number "123", a code of password "1234" for verifying the use right is set (f( ) indicating an encoding), and the screen title is "TANAKA."

The icon management table 20a is associated with the select screens managed by the screen management table 19a and comprises items: the icon number for each icon displayed on each screen; the file name of the display bit map for displaying the associated icon; the display character sequence displayed along with each icon; the scan job number associated with the icon; and x- and y-coordinates of display positions.

In the example shown in FIG. 12, setting/management for icon number "11" is made such that a bit map "data1" representing the database is set, a display character sequence "EQUIPMENT PLAN" is set, and scan job number "1" associated with this icon is set. The content of the scan job can be found by referring to the scan job number "1" in the scan job management table (to be described later).

The scan job management table 21a comprises items: the scan job number given to each scan job; the presence/absence of the execute right; the password for verifying the execute right; the name of the scan job program for executing the scan job; the scan parameter file name of the scan job; the job parameter file name; and the image ID given to the scanned image.

In the example shown in FIG. 13, no execute right is set on the scan job number "1" (a given use can execute the scan job) and accordingly no password is set. The scan job program name "database", to which the scanned image is to be transferred, the scan parameter file name "sc0001", and the job parameter file name "db0001" are set/managed. The item "image ID" stores the ID assigned to the scanned image after the execution of the image scan process.

The execute right is set on the scan job number "16" (the user informed of the password can execute the scan job), and a code of password "9876" (f( ) indicating an encoding) is set/managed. In addition, the scan job program name "sendmail", to which the scanned image is to be transferred, the scan parameter file name "sc0016", and the job parameter file name "ml0008" are set/managed. The item "image ID" stores the ID assigned to the scanned image after the execution of the image scan process.

A process executed by referring to the screen management table 19a, the icon management table 20a and the scan job management table 21a shown in FIGS. 11 to 13 will now be specifically described.

For example, if the "PRIVATE SCAN" is selected as the scan function, the control section 24 requests the input of the screen number of the scan job select screen. If the screen number "10", for example, is input, the control section 24 refers to the screen management table 19a and determines that no use right is set for the screen number "10." In this case, since no use right is set, the password is not input and the control section 24 causes the display section 13 to display the scan job select screen 60 for the general affairs division, as shown in FIG. 9, which shows the display character sequence "GENERAL AFFAIRS DIVISION."

Similarly, if the screen number "123" is input, the control section 24 refers to the screen management table 19a and determines that the use right is set for the screen number "123." In this case, the use right is set. Thus, the control section 24 generates a guidance instruction for the input of the password. The use right determination section 17 determines the presence/absence of the use right by checking whether the password input by the user through the ten-keys 30a on the operation panel 30 coincides with the preset password "1234" and recognizing the user. If it is recognized that the user has the use right on the basis of the password, that is, if it is determined that the use right is present, the control section 24 causes the display section 13 to display the scan job select screen 71 for the specified user (Tanaka), as shown in FIG. 10, which shows the display character sequence "TANAKA."

When the scan job select screen is displayed, the icon management table 20a is also referred to and the display bit map of the icon to be displayed and the display character sequence are taken out to constitute the icon. This icon is displayed at a position specified by the x- and y-coordinates.

When the icon has been selected on the scan job select screen, the icon management table 20a is referred to and the scan job number corresponding to the icon number is found. Thus, the detailed information of the scan job is acquired.

For example, when the icon "11" has been selected, as shown in FIG. 12, the control section 24 refers to the scan job management table 21a on the basis of the scan job number "1" corresponding to the control section 24. Thereby, the control section 24 determines that the execute right is not set and awaits the depression of the start button 30d. If the start button 30d is depressed, the control section 24 executes the scan of the document with the scan parameters designated by the scan parameter file "SC0001." The scanned image is provided with the user name, date and image ID and then stored in the image storage section 12.

If all documents have been scanned, the control section 24 transfers to the scan job program "database" the image of the stored image ID along with the job parameters designated by the job parameter file "db0001." Based on the scan job program "database" the process for registration in the database is executed.

When the icon "21" has been selected, as shown in FIG. 12, the control section 24 refers to the scan job management table 21a on the basis of the corresponding scan job number "16." Since the execute right is set for the scan job number "16," the control section 24 requests the input of the password by displaying the password input screen. The execute right determination section 16 determines whether the password input by the user through the ten-keys 30a coincides with the password (9876) preset and managed in advance. That is, the execute right determination section 16 verifies whether the user has the execute right.

If the coincidence of the password is determined, the control section 24 awaits the depression of the start button 30d. If the start button 30d is depressed, the control section 24 executes the scan of the document on the basis of the scan parameters designated by the scan parameter file "SC0016." The scanned image is provided with the image ID and then stored in the image storage section 12.

If all documents have been scanned, the control section 24 transfers to the scan job program "sendmail" the image of the stored image ID along with the job parameters designated by the job parameter file "ml0001." Based on the scan job program "sendmail," the process for mailing the scanned image is executed.

The flow of the user operations for executing the scan job will now be described with reference to a flow chart of FIG. 14.

The user who intends to execute the scan job goes to the digital copying machine 2, selects the scan function from among the composite functions provided by the digital copying machine 2, and depresses the function select button (step ST1). The display section 13 on operation panel 30 of digital copying machine 2 then displays the icons for selecting the scanner function, such as "COMMON SCAN" 31 and "PRIVATE SCAN" 32, as shown in FIG. 6.

If the user selects the icon 31 for "COMMON SCAN," the select screen of the icons for selecting the scan jobs belonging to the common scan is displayed. The user selects one of the scan jobs on the basis of the icons displayed on the screen (step ST2).

If the execute right is set on the scan job designated by the icon, the guidance instruction for the input of the password is displayed on the display section (step ST3). The user inputs the correct password through the ten-keys 30a on operation panel 30 and depresses the start button 30d (step ST4). Then, the image capturing system starts the execution of the scan job associated with the icon.

If the execute right is not set on the scan job designated by the icon selected by the user, the user does not input the password and depresses the start button 30d (step ST5). Then, the image capturing system starts the execution of the scan job associated with the icon.

If the user has selected the icon 32 for "PRIVATE SCAN," the display section 13 on operation panel 30 displays the input screen for designating the scan job select screen. In order to display the scan job select screen for selecting the scan job which the user wishes to select from among the plural scan job select screens belonging to the private scan, the user inputs the screen number of the desired scan job select screen through the ten-keys 30a on operation panel 30 (step ST6).

If the use right is set on the scan job select screen designated by the screen number by the user, the user inputs the password through the ten-keys 30a on operation panel 30 (step ST7). If the correct password is input, the scan job select screen of the designated screen number is displayed. The user selects and designates the icon associated with the scan job to be executed, from the displayed scan job select screen (step ST8).

In this case, if the execute right is set on the scan job designated by the icon, the display section 13 displays the guidance instruction for requesting the input of the password (step ST3). The user correctly inputs the password and depresses the start button 30d (step ST4). Thus, the image capturing system starts the execution of the scan job associated with the icon.

On the other hand, if the execute right is not set on the scan job designated by the icon selected by the user, the user does not input the password and depresses the start button 30d (step ST5). Thus, the image capturing system starts the execution of the scan job associated with the icon.

In step ST6, if the use right is not set for the input screen number, the display section 30 of the operation panel displays the designated scan job select screen without the input of the password. The user selects and designates one of the icons associated with the scan jobs displayed on the display section 30 (step ST9).

In this case, if the execute right is set on the scan job designated by the icon, the display section 13 displays the guidance instruction for requesting the input of the password (step ST3). The user correctly inputs the password and depresses the start button 30d (step ST4). Thus, the image capturing system starts the execution of the scan job associated with the icon.

On the other hand, if the execute right is not set on the scan job designated by the icon selected by the user, the user does not input the password and depresses the start button 30d (step ST5). Thus, the image capturing system starts the execution of the scan job associated with the icon.

Figure 16:
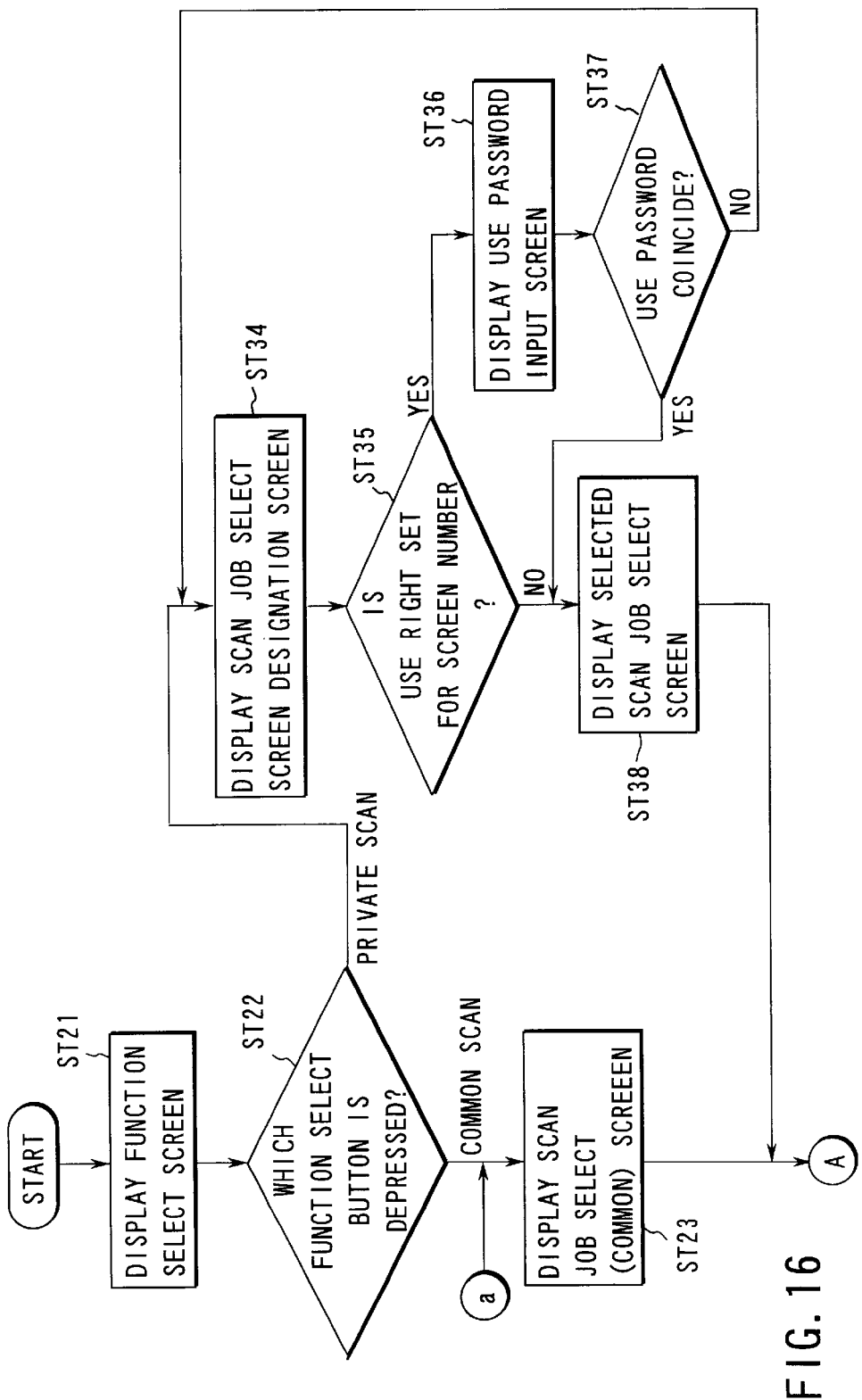
FIG. 16 is a flow chart for illustrating a flow of a scan job execution operation.
Figure 17:
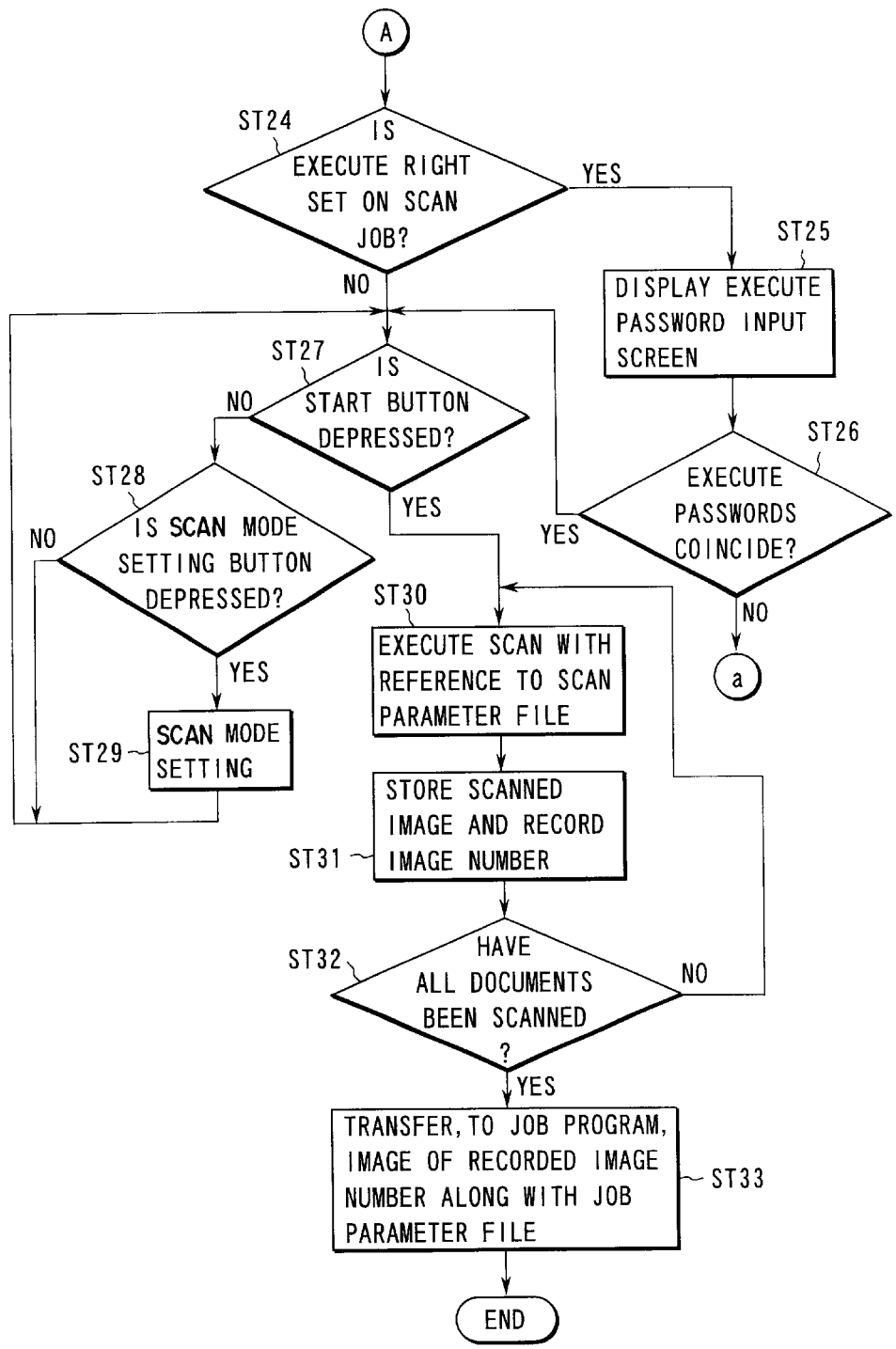
FIG. 17 is a flow chart for illustrating a flow of the scan job execution operation.

A process in which the scan job designated by the user is executed by the image capturing system will now be described with reference to flow charts of FIGS. 16 and 17.

If the scan is designated by the function select button of digital copying machine 2, the display section 13 of operation panel 30 displays the select screen for selecting the scan function to be used, between "COMMON SCAN" and "PRIVATE SCAN," as shown in FIG. 6 (step ST21). The control section 24 determines whether "COMMON SCAN" or "PRIVATE SCAN" has been selected as the scan function from the select screen (step ST22).

If it is determined that the "COMMON SCAN" has been selected, the control section 24 refers to the table with screen number "0" on the screen management table 19a and displays the scan job select screen, on which no use right is set and which has the display character sequence "COMMON" and corresponds to the common scan (step ST23).

If the user has selected one of the icons displayed on the scan job select screen, the control section 24 determines whether the execute right is set on the scan job associated with the icon selected on the basis of the icon management table 20a and scan job management table 21a (step ST24).

If it is determined that the execute right is set, the control section 24 displays the input screen for the password for executing the scan job (step ST25). When the user has input the password on the display screen, the execute right determination section 16 determines whether the input password coincides with the password managed on the icon management table 20a and scan job management table 21a (step ST26). If it is determined that the passwords do not coincide, the control section 24 returns to step ST23 and displays the scan job select screen once again.

In the case where the passwords have been determined to coincide or it is determined in step ST24 that the execute right is not set on the scan job designated by the icon by the user, the control section 24 determines whether the start button 30d has been depressed (step ST27).

Figures 14, 15:
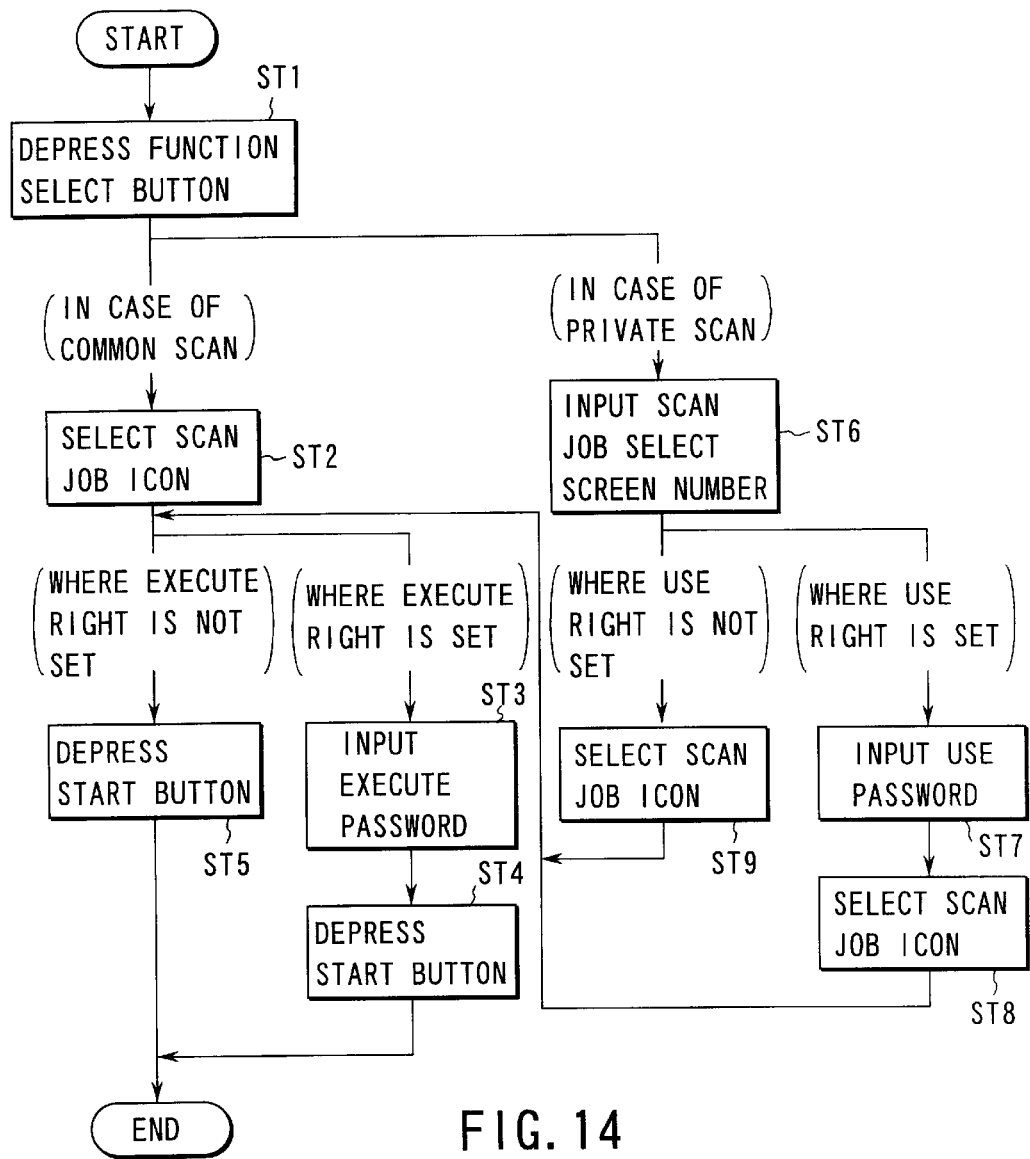
FIG. 14 is a flow chart for illustrating a flow of user operations.
FIG. 15 shows an example of display on a scan mode setting screen.

In this case, if the user has not depressed the start button 30d and has depressed the scan mode setting button (step ST28), the control section 24 determines that the scan mode setting button has been determined and displays a scan mode setting screen as shown in FIG. 15. If the user has set the scan mode based on the display, the control section 24 substitutes the contents designated by the user for the contents of the scan parameter file associated with the selected icon which are stored on the icon management table 20a and scan job management table 21a (step ST29).

If the user has depressed the start button 30d in step ST27, the control section 24 executes the selected scan job by referring to the scan parameters managed by the scan job management table 21a (step ST30). Further, the control section 24 furnishes the scanned image with information on the user name, date and image ID and stores it in the image storage section 12 (step ST31).

When the scan of the document is finished (step ST32), the control section 24 transfers to the job program the image stored in the image storage section 12 along with the job parameter file (step ST33). Thereby, the process for the scanned image, which is set by the scan job designated by the user, is executed.

When the user has selected the "PRIVATE SCAN" function in step ST22, the control section 24 displays the screen number input screen for designating the scan job select screen (step ST34). When the user has input the screen number on this input screen, the control section 24 refers to the scan job select screen management table 19a and determines whether the use right is set on the scan job select screen corresponding to the screen number input by the user (step ST35).

If it has been determined that the use right is set for the screen number, the control section 24 displays the input screen for inputting the password associated with the use right (step ST36). When the user has input the password on the display screen, the control section 24 determines whether the input password coincides with the password managed on the scan job select screen management table 19a (step ST37). If it has been determined that the passwords do not coincide, the control section 24 returns to step ST34 and displays the input screen for designating the scan job select screen.

If it has been determined that the password input by the user coincides or if the use right is not set for the screen number input by the user, the control section 24 determines the scan job select screen corresponding to the input screen number on the basis of the scan job select screen management table 19a and displays it on the display section 13 of operation panel 30 (step ST38). The control section 24 then goes to step ST24 and executes the processing from step ST24 to ST33.

As has been described above, in the present invention, the processes from the scanning of the document in the preset scan mode to the process executed for the scanned image are set as scan jobs. When the icon associated with the scan job is selected, the scan job is executed.

Thereby, the processes from the scanning of the document to the process executed for the scanned image can be automatically executed by selecting the associated icons, and the user operations are simplified and made easier.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image capturing system shared by a plurality of users, the system comprising:

an image scanning section which scans an image of a document in a plurality of scan modes;

a scan job management section which sets scan jobs, which includes a process to scan an image of a document in a scan mode and a process to execute a job on the image of the document scanned in the scan mode, in association with instruction keys; and an execute section which scans, when the instruction key associated with the scan job by the scan job management section has been designated, the document in the scan mode of the scan job associated with the designated instruction key, and executes the process set by the scan job on the scanned image;

a scan job management table which sets an execute right on that one of the scan jobs set by the scan job management section, the execution of which is permitted to a specified user alone; and an execute right determination section which determines whether the user has the execute right set on the scan job, when the instruction key associated with the scan job, on which the execute right is set by the scan job management table, has been designated, wherein when the execute right determination section has determined that the user has the execute right, the execute section executes the scan job on which the execute right is set.

2. An image capturing system according to claim 1, wherein the instruction keys are icons displayed on a touch panel, and the icon associated with the scan job on which the execute right is set indicates the setting of the execute right.

3. An image capturing system according to claim 1, wherein the instruction keys are icons displayed on a touch panel.

4. An image capturing system shared by a plurality of users, the system comprising:

an image scanning section which scans an image of a document in a plurality of scan modes;

a scan job management section which sets scan jobs, which includes a process to scan an image of a document in a scan mode and a process to execute a job on the image of the document scanned in the scan mode, in association with instruction keys;

a screen management section which sets a plurality of select screens for selecting the instruction keys set by the scan job management section;

an instruction input section which designates one of the select screens set by the screen management section;

a display section which displays the select screen designated by the instruction input section;

an execute section which executes the scan job associated with the instruction key by the scan job management section when the instruction key has been designated from the select screen displayed by the display section;

a screen management table which sets a use right on that one of the select screens set by the screen management section, the execution of which is permitted to a specified user alone; and a use right determination section which determines whether the user has the use right set on the select screen, when the select screen, on which the use right is set by the screen management table, has been designated by the instruction input section, wherein when the use right determination section has determined that the user has the use right, the display section displays the designated select screen on which the use right is set.

5. An image capturing system shared by a plurality of users, the system comprising:

an image scanning section which scans an image of a document in a plurality of scan modes;

a parameter management section which manages a scan parameter for determining a reading mode when the document is read by the image scanning section and a job parameter for determining contents of processing to be executed with respect to the document read in the reading mode determined by the scan parameter;

a scan job management section which sets a scan job set by a combination of the scan parameter and the job parameter managed by the parameter management section so as to be associated with an instruction key; and an execute section which, when the instruction key is designated, reads the image of the document in the reading mode determined by the scan parameter of the scan job associated with the instruction key, and executes the processing of the contents determined by the job parameter of the scan job associated with the instruction key.

6. An image capturing system according to claim 5, wherein the instruction keys are icons displayed on a touch panel.

7. An image capturing system shared by a plurality of users, the system comprising:

- an image scanning section which scans an image of a document in a plurality of scan modes;
- a scan job management section which sets scan jobs, which includes a process to scan an image of a document in a scan mode and a process to execute a job on the image of the document scanned in the scan mode, in association with instruction keys;
- a screen management section which classifies instruction keys, with which the scan job is associated by the scan job management section, into a plurality of groups and sets a selection screen for selecting each of the instruction keys for each of the groups;
- a display section which, when any of the groups in which a selection screen for selecting each of instruction keys, with which a scan job is associated by the screen management section, is designated, displays the selection screen for selecting an instruction key belonging to the designated group; and
- an execute section which executes the scan job associated with the instruction key by the scan job management section when the instruction key has been designated from the select screen displayed by the display section.

8. An image capturing system according to claim 7, wherein groups into which instruction keys, with which scan jobs are associated by the scan job management section, are classified, are one common group used by all users and a plurality of individual groups used by specific users.

* * * * *